Feb. 7, 1933.  E. H. WHITE  1,896,130
PLANE COVERING FASTENER
Filed Jan. 30, 1931
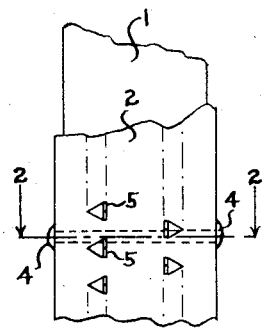
Fig. 1.
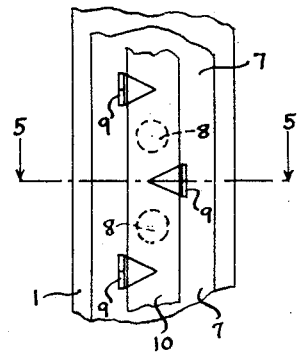
Fig. 4.
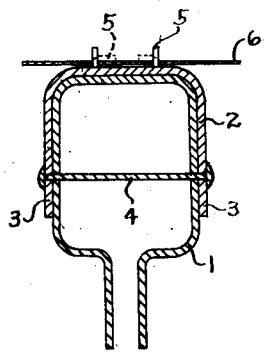
Fig. 2.
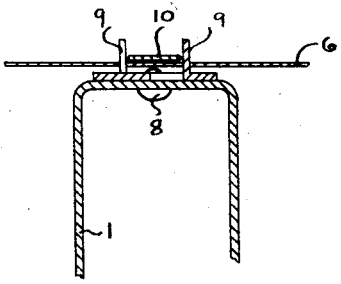
Fig. 5.
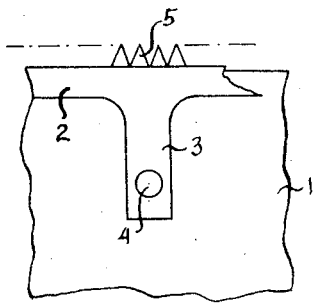
Fig. 3.
Fig. 6.
INVENTOR.
Edwin H. White
BY   A. Ponack
ATTORNEY Patented Feb. 7, 1933

1,896,136

UNITED STATES PATENT OFFICE

EDWIN H. WHITE, OF BALTIMORE, MARYLAND

PLANE COVERING FASTENER

Application filed January 30, 1931. Serial No. 512,438.

The present invention relates to improvements in the aeroplane art. More specifically, this invention has particular relation to fastening devices adapted to securely and removably fasten the fabric or equivalent covering of a plane of a flying machine to the rib of an airfoil, airfoil section, or other surface.

The primary object of the present invention is to provide a new and improved fastener of the character described whereby a plane covering, which may be of linen, cotton, metal or any other suitable material, may be efficiently fastened to a rib of the plane or any other suitably constructed member over its entire length by means of a plurality of bendable lugs or the like. Such a fastener has many advantages over the fastening means now generally in use, many of which involve the use of tying cords, stitchings, buttons, and the like. The several lugs of the fasteners of the present invention may be suitably spaced so that the covering material may closely conform to the entire contour of the wing section, as determined by the shape of the rib. The fasteners may be cheaply and conveniently manufactured, and are readily and securely attachable to the rib, or if desirable, may be made integral with the latter. The same fastener may be used in connection with a second and successive coverings, should recovering of the plane be necessary. An important feature is the ease with which the process of fastening may be carried out, according to the present invention.

To the accomplishment of this object and such others as may hereinafter appear, the various features of the present invention relate to certain devices, combinations and arrangements of parts fully set forth hereinafter, the advantages of which will be readily understood by those skilled in the art to which this invention pertains.

The various features of this invention will be best understood from a consideration of the following description thereof in the light of the accompanying sheet of drawing, which illustrate several preferred embodiments of the invention.

In the said drawing,

Fig. 1 is a partial top plan view of an airfoil rib or other frame member, showing one form of fastener attached thereto;

Fig. 2 is a cross-sectional view taken along line 2—2 of Fig. 1, and also showing a portion of the plane covering;

Fig. 3 is a partial side view of the construction illustrated in Figs. 1 and 2;

Fig. 4 is a partial top plan view of an airfoil rib or other frame member, showing a second modification of covering fastener;

Fig. 5 is a cross-sectional view taken along line 5—5 of Fig. 4, and also showing a portion of the plane covering; and Fig. 6 is a view similar to Fig. 5, but illustrating a third modification of the invention.

Similar reference numerals refer to similar parts throughout the several figures of drawing.

Referring now to the drawing, reference numeral 1 indicates the rib or other frame member of an airfoil of a flying machine. Mounted upon the said rib 1 and conforming in shape to the latter is the metallic fastener 2. The material of which the said fastener may preferably be made is any metal, such as wrought iron, or non-corrosive steel which may be bent a relatively large number of times without breaking. Extending downwardly from each side of the fastener 2, and in spaced relation to each other, are a plurality of tongues 3. Corresponding tongues 3 on each side of the fastener 2 are disposed directly opposite each other, thus enabling a bolt, rivet, or other suitable fastening element 4 to be passed through each pair of tongues 3 and the rib member 1, securely attaching the fastener 2 to the said rib member. Projecting upwardly from the body of the fastener 2 are a plurality of series of teeth or lugs 5, as clearly shown in Fig. 1. These teeth may preferably be formed by perforation or punching out from the body of the fastener 2 to assume positions approximately at right angles to the latter. While the lugs or teeth 5 are shown as being triangular in shape, it is obvious that they may be made of this or any other desirable configuration. The said lugs may be staggered as shown in Fig. 1, or they may be spaced or otherwise arranged in any suitable or desirable relation.

It is to be understood that, although but several teeth or lugs 5 are shown in the drawing, they nevertheless extend over the entire length of the fastener 2, as indicated by the dot and dash lines in Figs. 1 and 3. It is also to be understood that tongues 3 project downwardly from the body of the fastener 2 at intervals throughout the entire extent of the latter.

The method of attaching a fabric or equivalent covering 6 to the rib 1 or equivalent surface of an airfoil is as follows. The plane covering is placed over the upstanding teeth or lugs 5, and is pushed firmly down over the said lugs. The latter are then bent over into the bent position, as shown by the dotted outline of the lugs in Fig. 2. The covering 6 is thus securely, but removably, attached to the rib. Upon recovering the airfoil, the lugs are first bent back to their original upright position, the old covering is removed by lifting up to clear the lugs, and then the above-outlined procedure is again followed using the new covering. In view of the ductile character of the lugs 5, this procedure may be followed a number of times, if necessary, without need of renewing the fasteners.

In Figs. 4 and 5, a second form of fastener is illustrated. This fastener 7 comprises a flat sheet of ductile metal which is supported on top of the rib or frame member 1, to which it may be securely attached by means of a plurality of spaced rivets or other suitable fastening elements 8. Struck upwardly from the body of the fastener 7 are a plurality of series of teeth or lugs 9, similar to the lugs 5 above-described.

In using this form of fastener, the method above outlined in connection with the first modification of the invention is followed. However, before the lugs 9 are bent over, a flat thin strip 10 of suitable metal is placed upon the covering 6 between the two rows of lugs, and then the latter are bent over. The metallic strip 10 acts to protect the fabric covering from any possible destructive action, such as tearing, of the lugs. It is obvious that any of the forms of the present invention may be used with or without the strip 10.

A third form of invention is shown in Fig. 6. Here the lugs or teeth 11 are perforated or punched up from the material of the rib itself, thus eliminating the necessity of using separate fasteners, such as members 4 and 8 of the first two modifications of the invention.

While I have shown several preferred embodiments of my device, it will be understood that various structural modifications may be made without departing from the spirit and scope of the invention as set forth in the appended claims.

I claim:

1. In a plane structure of the character described, in combination, a frame member, a covering, a covering fastener mounted upon and conforming to the shape of said frame member, means for attaching said fastener to said frame member comprising a plurality of pairs of tongues extending downwardly from said fastener on opposite sides thereof and bolt means passing through said tongues and frame member, said fastener having a plurality of series of upwardly projecting teeth of ductile material adapted to receive and be bent over upon said covering.

2. The construction set forth in claim 1, and a protective strip adapted to be interposed between said covering and the bent-over portion of said teeth.

EDWIN H. WHITE.